US008427069B2

(12) United States Patent
Wibben

(10) Patent No.: US 8,427,069 B2
(45) Date of Patent: Apr. 23, 2013

(54) CURRENT-REGULATED POWER SUPPLY WITH SOFT-START PROTECTION

(75) Inventor: Josh Wibben, Eden Prairie, MN (US)

(73) Assignee: Polar Semiconductor, Inc., Bloomington, MN (US)

(*) Notice: Subject to any disclaimer, the term of this patent is extended or adjusted under 35 U.S.C. 154(b) by 258 days.

(21) Appl. No.: 12/819,819

(22) Filed: Jun. 21, 2010

(65) Prior Publication Data

US 2010/0320935 A1   Dec. 23, 2010

Related U.S. Application Data

(60) Provisional application No. 61/219,204, filed on Jun. 22, 2009.

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ........... 315/291; 315/224; 315/201; 315/156; 323/222; 323/285

(58) Field of Classification Search .......... 315/291, 315/71, 106, 116, 156, 151, 158, 171, 200, 315/224, 279, 201; 323/222, 224, 283, 285
See application file for complete search history.

(56) References Cited

U.S. PATENT DOCUMENTS

| 7,129,679 | B2 * | 10/2006 | Inaba et al. | 323/222 |
|---|---|---|---|---|
| 7,825,610 | B2 * | 11/2010 | Zhao et al. | 315/299 |
| 7,973,487 | B2 * | 7/2011 | Vaucourt et al. | 315/224 |
| 8,053,315 | B2 * | 11/2011 | Tai et al. | 438/270 |
| 8,169,161 | B2 * | 5/2012 | Szczeszynski et al. | 315/308 |
| 2008/0266738 | A1 | 10/2008 | Kimber | |
| 2009/0174345 | A1 * | 7/2009 | Vaucourt et al. | 315/294 |
| 2010/0134040 | A1 * | 6/2010 | Elder | 315/294 |
| 2010/0213859 | A1 * | 8/2010 | Shteynberg et al. | 315/224 |
| 2011/0115388 | A1 * | 5/2011 | Sontag et al. | 315/185 R |
| 2011/0121754 | A1 * | 5/2011 | Shteynberg et al. | 315/294 |
| 2011/0309759 | A1 * | 12/2011 | Shteynberg et al. | 315/201 |

* cited by examiner

*Primary Examiner* — Shawki Ismail
*Assistant Examiner* — Dylan White
(74) *Attorney, Agent, or Firm* — Kinney & Lange, P.A.

(57) ABSTRACT

A current-regulated power supply provides soft-start protection to prevent the generation of large in-rush currents. The current-regulated power supply includes a current regulation module that operates in either a soft-start mode of operation or a normal mode of operation and a mode selection module that makes mode of operation determinations. In particular, mode-selection module monitors the load current supplied to the attached load and maintains the current-regulation module in the soft-start mode of operation until the monitored load current exceeds a threshold value, at which time the mode-selection module causes the current regulation module to operate in the normal mode of operation.

30 Claims, 6 Drawing Sheets

CURRENT-REGULATED POWER SUPPLY WITH SOFT-START PROTECTION

BACKGROUND

The present invention relates to a power supply, and more particularly to a current-regulated power supply with soft-start protection.

Current-regulated switch mode power supplies operate by monitoring the current through a load and selectively turning a switching On and Off to regulate the current to a desired value. Current-regulated power supplies are employed in a variety of applications, including light-emitting diode products in which the load connected to the current-regulated power supply is comprised of a plurality of light-emitting diodes (LEDs). However, during start-up of a power supply connected to a load having diode-like characteristics, no substantial current flows through the load until a threshold voltage has been reached across the load sufficient to forward bias the diode(s). Without load current feedback, the controller associated with the current-regulated power supply operates in an open-loop mode. As a result, large in-rush current can be generated during start-up. It would therefore be desirable to provide a current-regulated power supply capable of limiting in-rush currents during startup.

SUMMARY

A controller for regulating a supply of power provided from a current-regulated power supply to a load provides soft-start protection to limit in-rush currents. The controller includes a current-regulation module and a mode-selection module. The current-regulation module is connectable to monitor and regulate current provided by the current-regulated power supply to the load and operates in either a normal mode of operation or a soft-start mode of operation. The mode-selection module is also connectable to monitor the load current, wherein the mode-selection module causes the current-regulation module to operate in the soft-start mode until the monitored load current exceeds a threshold value, wherein the mode-selection module causes the current-regulation module to operate in the normal mode of operation.

DETAILED DESCRIPTION

Figure 1:
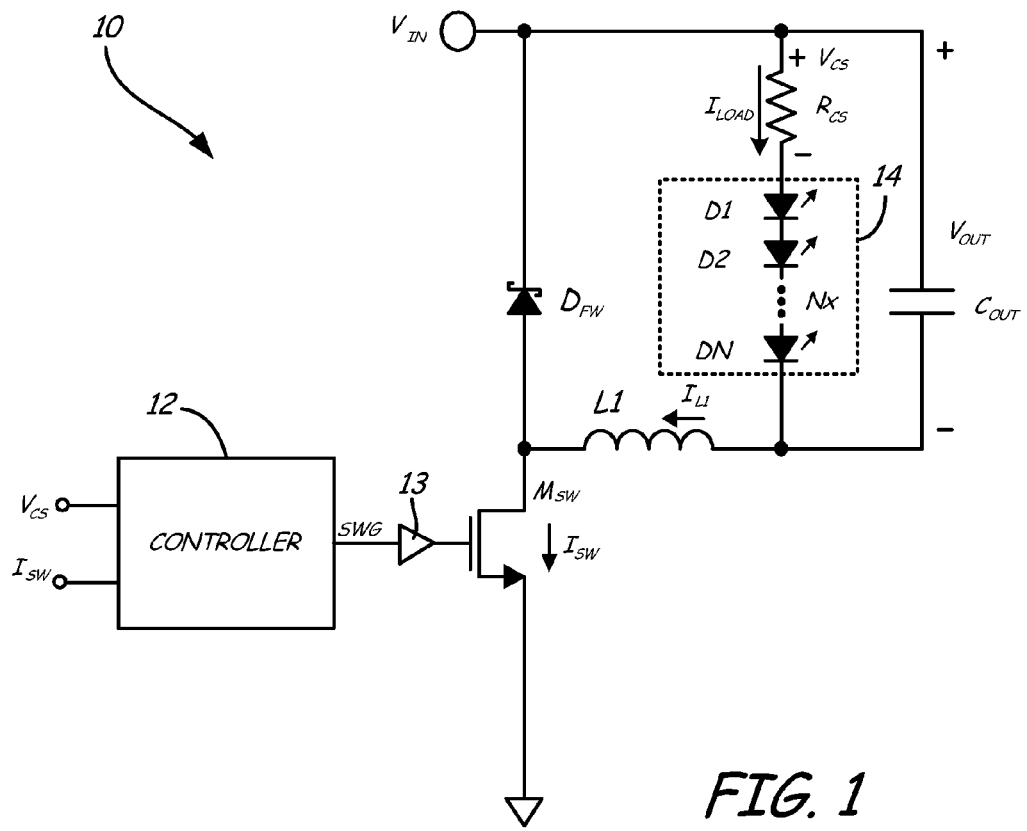
FIG. 1 is a circuit diagram of a current-regulated power supply with soft-start protection according to an embodiment of the present invention.

FIG. 1 is a circuit diagram of a current-regulated power supply with soft-start protection according to an embodiment of the present invention. Current-regulated power supply 10 includes current-sense resistor $R_{CS}$, capacitor $C_{OUT}$, inductor L1, Schottky diode $D_{FW}$, metal-oxide semiconductor field-effect transistor (MOSFET) SW, controller 12, and gate driver circuit 13. In the embodiment shown in FIG. 1, current-regulated power supply 10 is connected in a buck configuration to provide current-regulated power to load 14, which includes a plurality of series-connected light-emitting diodes (LEDs) D1, D2, ..., DN. A person of ordinary skill in the art will recognize that other power supply configurations, such as boost, buck-boost, etc. may be employed to provide current-regulated power to a particular load. In addition, circuit elements such as MOSFET $M_{SW}$ may be replaced with equivalent circuit elements such as bipolar junction transistors (BJT) or other switch-like devices. For the sake of simplicity, MOSFET $M_{SW}$ will be referred to as switching device $M_{SW}$ due to the switch-like function provided by the MOSFET in this application. For example, when the gate drive signal SWG provided to the gate of the MOSFET $M_{SW}$ is a logic high value, MOSFET $M_{SW}$ behaves as a switch that has been turned On or closed. Conversely, when the gate drive signal SWG provided to the gate of MOSFET $M_{SW}$ is a logic low value, MOSFET $M_{SW}$ behaves as a switch that has been turned Off or opened.

Current-regulated power supply 10 receives input power via input terminal $V_{IN}$ and acts to provide current-regulated power to load 14. Controller 12 monitors the voltage $V_{CS}$ across current-sense resistor $R_{CS}$, which reflects the load current $I_{LOAD}$ through load 14, and regulates the monitored load current by selectively turning On and Off switching device $M_{SW}$. During normal operation, when switching device $M_{SW}$ is On (i.e., conductive), power supplied via input terminal $V_{IN}$ flows through current-sense resistor $R_{CS}$, load 14, inductor L1 and switching device $M_{SW}$ to ground. During the On time of switching device $M_{SW}$, inductor L1 stores energy. When switching device $M_{SW}$ is subsequently turned Off (i.e., non-conductive), the conductive path from input terminal $V_{IN}$ through load 14, inductor L1 and switching device $M_{SW}$ is open. As a result, energy stored in inductor L1 causes Schottky diode $D_{FW}$ to become forward biased, and current is caused to flow in the circuit path defined by inductor L1, Schottky diode $D_{FW}$, current-sense resistor $R_{CS}$ and load 14. As inductor L1 discharges, the current through load 14 dissipates until switching device $M_{SW}$ is turned On, at which time the current through load 14 begins increasing. Capacitor $C_{OUT}$, connected in parallel with current-sense resistor $R_{CS}$ and load 14, acts to smooth the voltage ripple across the terminals defined by current-sense resistor $R_{CS}$ and load 14 (i.e., voltage $V_{OUT}$), which in turn reduces the current ripple through load 14. The combination of current-sense resistor $R_{CS}$, load 14, and capacitor $C_{OUT}$ form an output circuit. Controller 12 acts in general to regulate the power provided the output circuit.

However, for loads exhibiting diode-like characteristics, such as the plurality of serially-connected light-emitting diodes (LEDs) making up load 14, until the voltage across the load is sufficient to forward bias each diode, no current is allowed to flow (i.e., the load is not in a forward conduction mode). This is typically the situation during start-up, during which time the voltage across capacitor $C_{OUT}$ (i.e., voltage $V_{OUT}$) is not large enough to forward bias LEDs D1-DN. In embodiments such as the one shown in FIG. 1, where capacitor $C_{OUT}$ is connected in parallel with the series combination of load 14 and current-sense resistor $R_{CS}$, when the voltage across load 14 is not sufficient to forward bias the associated diodes no current flows through current-sense resistor $R_{CS}$. This lack of current though current-sense resistor $R_{CS}$ causes controller 12 to operate in an open-loop mode until capacitor $C_{OUT}$ is charged to a voltage sufficiently large to forward bias the LEDs making up load 14. Controller 12 is configured according to embodiments of the present invention to provide for at least two modes of operation, a soft-start mode of operation and a normal mode of operation. Controller 12 determines the correct operating state based on the current measurement associated with current-sense resistor $R_{CS}$. During the soft-start mode, controller 12 controls the operation of switching device $M_{SW}$ to minimize the generation of large charging currents, despite the lack of specific information regarding the current through load 14.

Figure 2:
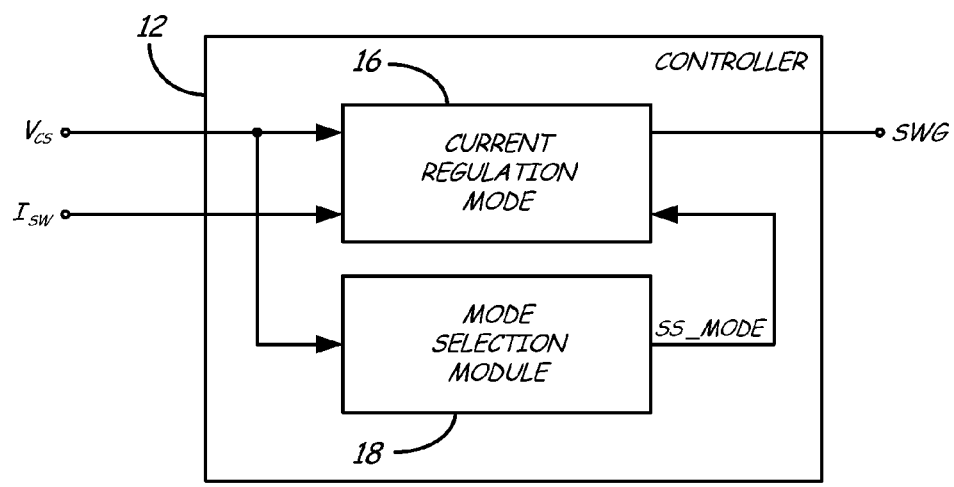
FIG. 2 is a block diagram of a controller employed by the current regulated power supply to provide soft start protection according to an embodiment of the present invention.

FIG. 2 is a block diagram of controller 12 employed by the current regulated power supply to provide soft start protection according to an embodiment of the present invention. In particular, FIG. 2 illustrates the interaction between current regulator module 16 and mode selection module 18. Mode selection module 18 makes mode selection decisions based on the monitored current-sense voltage $V_{CS}$, and provides the mode selection input to current regulation module 16.

Current regulator module 16 is responsible for generating switching device control signal SWG for selectively turning On and Off switching device $M_{SW}$ (via gate drive circuit 13, shown in FIG. 1). Current regulator module 16 receives as inputs the monitored load current as represented by the current-sense voltage $V_{CS}$ measured across current-sense resistor $R_{CS}$, the monitored switch current $I_{SW}$, and a mode-selection signal SS_mode provided by mode selection module 18. Based on the mode-selection signal SS_mode provided by mode selection module 18, current regulator module 16 operates in either a soft-start mode of operation or a normal mode of operation. Various embodiments for implementing both of these modes of operation are described in more detail with respect to FIGS. 3, 4A, 4B, and 6.

Figure 3:
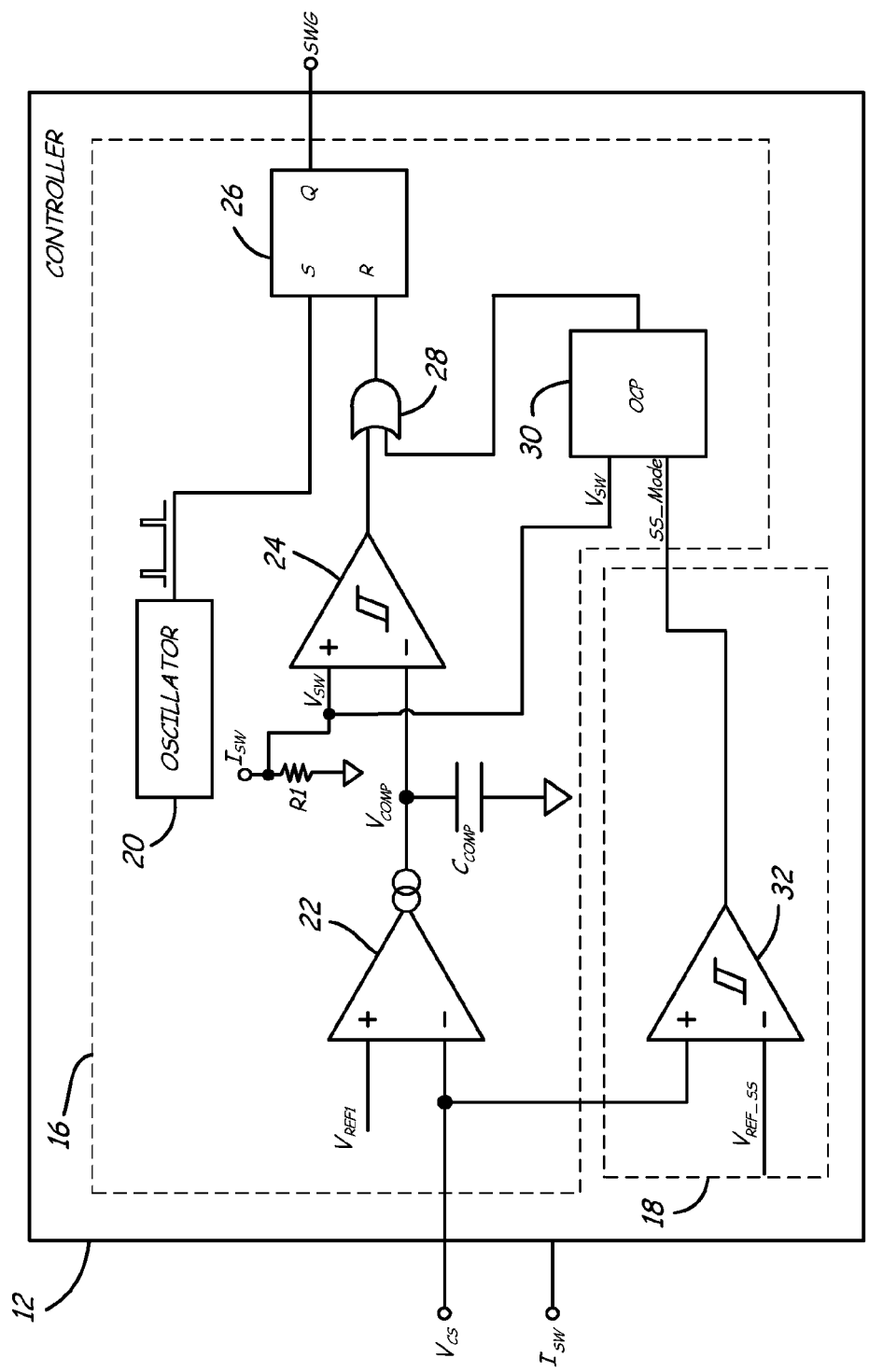
FIG. 3 is a circuit diagram illustrating in additional detail the controller employed by the current-regulated power supply to provide soft start protection according to an embodiment of the present invention.

FIG. 3 is a circuit diagram illustrating in additional detail controller 12 employed by the current-regulated power supply to provide soft start protection according to an embodiment of the present invention. Current regulator module 16 includes oscillator 20, error amplifier 22, capacitor $C_{COMP}$, hysteretic comparator 24, memory module 26, logical OR gate 28, resistor R1, and over-current protection (OCP) module 30. In general, oscillator 20 generates pulses according to a fixed frequency that is provided to the set terminal of memory module 26, which in the embodiment shown in FIG. 3 is a Set-Reset (SR) latch. In response to a set pulse from oscillator 20, the output of memory module 26 (i.e., gate drive signal SWG) is a logic high value that turns On switching device $M_{SW}$ (shown in FIG. 1). Switching device $M_{SW}$ remains On until a reset pulse is received at the reset terminal of memory module 26, at which time switching device $M_{SW}$ is turned Off. In this embodiment, the frequency of the switching device $M_{SW}$ is constant as defined by oscillator 20, but current regulation is provided by selectively controlling the duty cycle (i.e., ratio of On time to Off time) as defined by the generation of the Reset pulse provided to memory module 26.

Error amplifier 22, capacitor $C_{COMP}$, and hysteretic comparator 24 control the duty cycle of the switch gate drive signal SWG to regulate the load current $I_{LOAD}$ through load 14 using current-mode control. During normal operation the error between the monitored load current $I_{LOAD}$ as represented by the voltage $V_{CS}$ across current-sense resistor $R_{CS}$ and the reference voltage $V_{REF1}$ is amplified by error amplifier 22, wherein the reference voltage $V_{REF1}$ is representative of the desired load current. Error amplifier 22 and capacitor $C_{COMP}$ act as an integrator, that adjusts the $V_{COMP}$ voltage to reduce the error between the reference voltage $V_{REF1}$ and current-sense voltage $V_{CS}$. Hysteretic comparator 24 compares the error voltage $V_{COMP}$ to the rising switch current $I_{SW}$ (converted to a voltage $V_{SW}$ by the presence of resistor R1) to determine whether to turn Off switching device $M_{SW}$. In this example, when the monitored switch current $I_{SW}$ rises above voltage $V_{COMP}$ (or conversely, the voltage $V_{COMP}$ falls below the monitored switching device current $I_{SW}$), then hysteretic comparator 24 generates a logic high value that is communicated through logical OR gate 28 to the reset terminal of memory module 26. In response, the On time of the switch gate drive signal SWG is ended and switching device $M_{SW}$ remains Off until the start of the next cycle defined by oscillator 20. In this way, current regulator module 16 regulates the load current $I_{CS}$ to a desired value. In the embodiment provided in FIG. 3, current regulator module 16 operates in a current-mode control to regulate the load current, but in other embodiments may make use of other control schemes to regulate the load current, such as a voltage-mode control, hysteretic control, or constant on-time control.

In the embodiment shown in FIG. 3, current regulator module 16 further includes over-current protection (OCP) module 30, which acts to limit the switching current $I_{SW}$. In other embodiments, over-current protection module 30 acts to more generally monitor and limit the current delivered to the output circuit described with respect to FIG. 1 as including current-sense resistor $R_{CS}$, load 14, and capacitor $C_{OUT}$. Switching current $I_{SW}$ is representative of the current delivered to the output circuit (i.e., the output current), and is employed throughout this description for the sake of simplicity. By way of example, other embodiments may monitor the output current via the current through inductor L1.

In general, over-current protection module 30 compares the monitored switch current $I_{SW}$ (converted to a voltage $V_{SW}$) to a threshold value. When the monitored switch current $I_{SW}$ is less than the threshold value, the output of OCP module 30 is a logic low value that does not affect the On time of switching device $M_{SW}$ (i.e., does not reset memory module 26). However, when the monitored switch current $I_{SW}$ is greater than the threshold value, OCP module 30 generates a logic high value that is communicated through logical OR gate 28 to the reset terminal of memory module 26. In response, the gate drive signal SWG is reset to a logic low value and switching device $M_{SW}$ is turned Off. In this way, OCP module 30 prevents large currents from being generated across switching device $M_{SW}$.

In addition, in the embodiment shown in FIG. 3, over-current protection module 30 implements the normal and soft-start modes of operation of current regulation module 16 based on the control signal SS_mode provided by mode-selection module 18. As described above, over-current protection module 30 acts to turn Off switching device $M_{SW}$ when the monitored switch current $I_{SW}$ (or representative voltage $V_{SW}$) exceeds a threshold value. During the normal mode of operation, the threshold value is set at a level designed to prevent damage to switching device $M_{SW}$. However, during the soft-start mode of operation, during which time no information regarding the load current $I_{LOAD}$ is available, over-current protection module 30 may be employed to limit in-rush currents by decreasing the threshold value to which switching device current $I_{SW}$ is normally compared. Without the lower threshold, controller 16 would allow the current to increase to the normal (higher) threshold designed to prevent damage. This may result in an unreasonably high current demand on the power supply connected to input terminal $V_{IN}$.

Mode-selection module 18 determines the mode of operation of current regulation circuit 16 based on the monitored current-sense voltage $V_{CS}$. In the embodiment shown in FIG. 3, mode-selection module 18 includes hysteretic comparator 32. The output of comparator 32 (i.e., control signal SS_mode) is provided as an input to over-current protection module 30, and determines the operating state of over-current protection module 30. At startup the current-sense voltage $V_{CS}$ is zero, due to the capacitor $C_{OUT}$ being fully depleted, and as a result comparator 32 provides a logic high signal to current regulation module 16 (specifically to over-current protection module 30) selecting the soft-start mode of operation. When the monitored current-sense voltage $V_{CS}$ exceeds the soft-start reference voltage $V_{REF\_SS}$ (indicating that current has begun flowing through load 14), comparator 32 provides a logic low signal to current regulation module 16 selecting the normal mode of operation. In this configuration, if capacitor $C_{OUT}$ is depleted and the current-sense voltage $V_{CS}$ drops below the soft-start reference voltage $V_{REF\_SS}$, comparator 32 will provide a logic high signal to regulation module 16 selecting the soft-start mode of operation.

In the embodiment shown in FIG. 3, the transition from the soft-start mode of operation is based on the monitored load current $I_{LOAD}$ as represented by current-sense voltage $V_{CS}$. Initially, because of the diode-like characteristic of load 14 (i.e., load 14 remains reverse biased until a threshold voltage is reached), no current flows through load 14 and therefore the monitored voltage $V_{CS}$ is zero. Current regulation module 16 operates in the soft-start mode, with over-current protection module 30 employing the lower threshold value for limiting the switching device current $I_{SW}$. When the voltage on capacitor $C_{OUT}$ (as shown in FIG. 1) charges to a voltage sufficient to forward bias the LEDs making up load 14, then a current begins to flow through load 14 that is reflected in the voltage value $V_{CS}$. When the voltage value $V_{CS}$ exceeds the threshold value $V_{REF\_SS}$ then the soft-start mode of operation is ended and current regulation module 16 operates in the normal mode of operation, in which over-current protection module 30 employs the higher threshold value for limiting switch current $I_{SW}$.

To ensure proper operation, the threshold value $V_{REF\_SS}$ must be selected in conjunction with the threshold value for over-current protection module 30 in soft-start mode. The threshold value of the over-current protection module in soft-start mode sets the maximum current that is delivered to the load, and thus the threshold value also sets the maximum voltage that can be generated across the current-sense resistor $R_{CS}$. To ensure that mode-selection module 18 will transition out of the soft-start mode into the normal mode of operation, the soft-start reference voltage $V_{REF\_SS}$ must be set below the maximum voltage that can be generated across current-sense resistor $R_{CS}$ while in the soft-start mode. Conversely, the soft-start reference voltage $V_{REF\_SS}$ should be selected high enough so that mode-selection module 18 does not falsely change modes due to ground drops, leakage currents, or other second order effects.

Figure 4A:
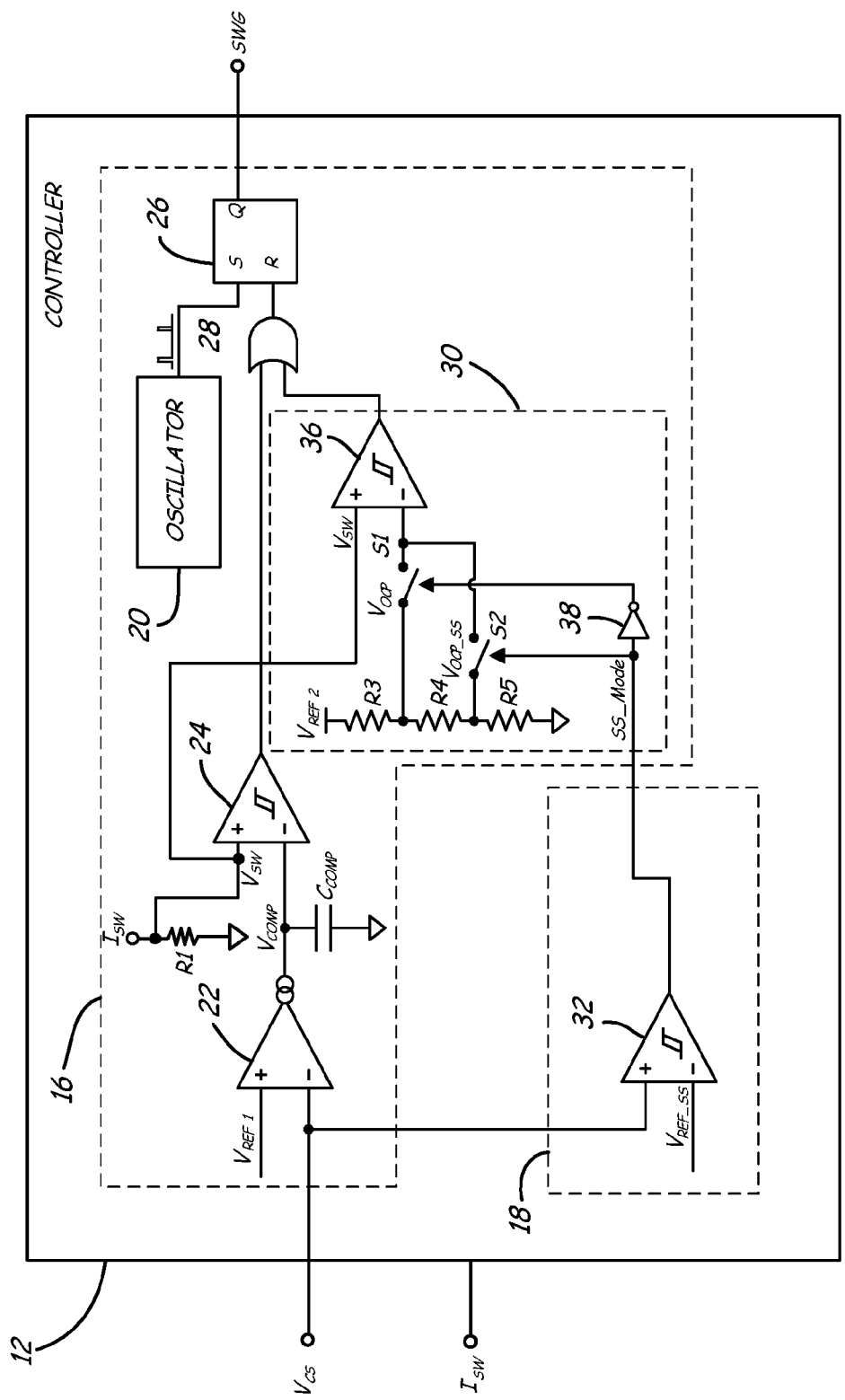
FIGS. 4A-4B are circuit diagrams illustrating in additional detail the controller employed by the current-regulated power supply to provide soft start protection according to embodiments of the present invention.
Figure 4B:
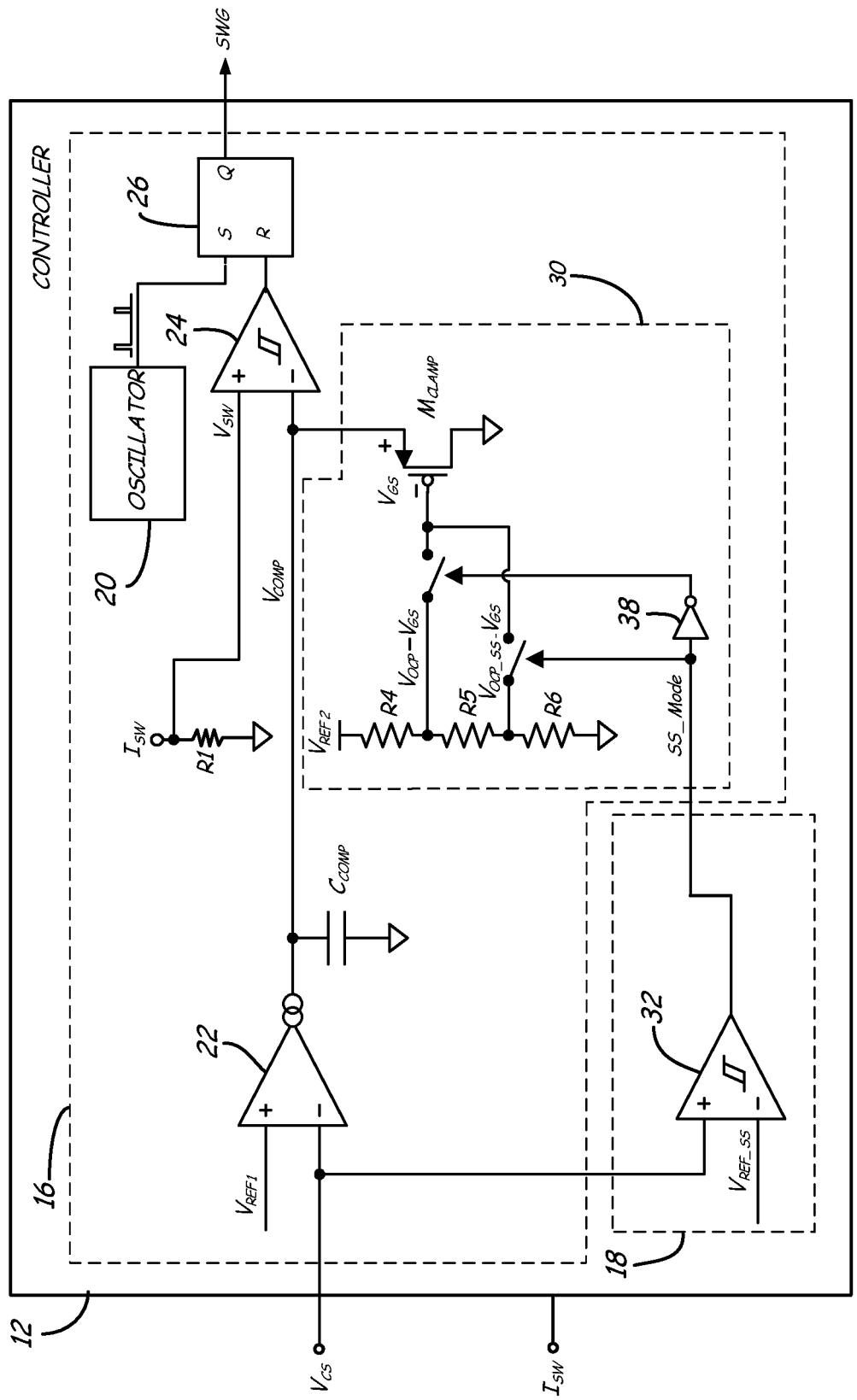

FIGS. 4A-4B are circuit diagrams illustrating in additional detail controller 12 employed by the current-regulated power supply to provide soft start protection according to embodiments of the present invention. In the embodiments shown in FIG. 4A, current regulation module 16 once again includes oscillator 20, error amplifier 22, capacitor $C_{COMP}$, hysteretic comparator 24, memory module 26, logical OR gate 28, resistor R1, and over-current protection module 30. Likewise, mode-selection module 18 once again includes hysteretic comparator 32.

In the embodiment provided in FIG. 4A, over-current protection module 30 further includes resistors R3, R4, and R5, switches S1 and S2, hysteretic comparator 36, and inverter circuit 38. Resistors R3, R4, and R5 form a voltage divider network that provides for different threshold voltages (e.g., over-current threshold $V_{OCP}$ and soft-start threshold $V_{OCP\_SS}$) to be applied to the inverting terminal of hysteretic comparator 36 depending on the desired mode of operation. That is, the combination of resistors R3, R4, and R5 along with switches S1 and S2 provide a threshold selection circuit for selecting either the normal threshold value $V_{OCP}$ or the soft-start threshold value $V_{OCP\_SS}$. When the control signal provided by mode-selection module 18 is a logic high value (indicating operation in the soft-start mode), then switch S2 is closed, resulting in threshold voltage $V_{OCP\_SS}$ being applied to the inverting input of hysteretic comparator 36. Conversely, when the control signal provided by mode-selection module 18 is a logic low value (indicating operation in the normal mode), then switch S1 is closed, resulting in threshold voltage $V_{OCP}$ being applied to the inverting terminal of hysteretic comparator 36. The monitored switch current $I_{SW}$ (specifically, the voltage $V_{SW}$ representing the monitored switch current) is provided to the non-inverting terminal of hysteretic comparator 36. When the voltage $V_{SW}$ representative of the monitored switch current $I_{SW}$ exceeds the selected threshold value (either $V_{OCP}$ or $V_{OCP\_SS}$), then a reset pulse is provided via logical OR gate 28 to the reset terminal of memory module 26, causing switching device $M_{SW}$ to be turned Off. During the soft-start mode, selection of the smaller threshold $V_{OCP\_SS}$ (relative to threshold $V_{OCP}$) causes over-current protection module 30 to limit the switch current $I_{SW}$ to a lower value during start-up, thereby minimizing in-rush currents. During the normal mode of operation, the higher threshold $V_{OCP}$ is employed to provide over-current protection. A benefit of the embodiment described with respect to FIG. 4A, which takes advantage of functions performed by over-current protection module 30, is the limited amount of additional circuitry required to provide the desired soft start protection.

The embodiment shown in FIG. 4B provides an alternative circuit configuration for implementing the soft-start and normal modes of operation. In the embodiment shown in FIG. 4B, hysteretic comparator 36 (shown in FIG. 4A) is replaced with a P-type metal-oxide semiconductor field effect transistor (MOSFET) $M_{CLAMP}$. In contrast with the embodiment employed in FIG. 4A, which employed a logical OR gate 28 connected to the reset terminal of memory module 26, the embodiment provided in FIG. 4B connects the source of MOSFET $M_{CLAMP}$ to the output of error amplifier 22 to act as a clamp and the $V_{COMP}$ voltage from exceeding the $V_{OCP}$ or $V_{OCP\_SS}$ threshold. The embodiment provided in FIG. 4B therefore provides the same function as that provided by comparator 36 and OR gate 28 shown in FIG. 4A, but employs fewer components. A benefit of the embodiment provided in FIG. 4B is that the $V_{COMP}$ voltage is controlled by the over-current protection module 30, thereby preventing the $V_{COMP}$ voltage from becoming saturated during open-loop control. When the control signal SS_mode is a logic high value (indicating operation in the soft-start mode), then switch S2 is turned On and a voltage of $V_{OCP\_SS}$-$V_{GS}$ is applied to the gate of transistor $M_{CLAMP}$ to implement the threshold voltage $V_{OCP\_SS}$. When $V_{COMP}$ is below the $V_{OCP\_SS}$ threshold voltage, $M_{CLAMP}$ remains inactive and error amplifier 22 fully controls the On time of switching device $M_{SW}$. When $V_{COMP}$ approaches the $V_{OCP\_SS}$ threshold voltage, $M_{CLAMP}$ prevents $V_{COMP}$ from exceeding the threshold, thereby reducing the threshold value to which switching device current $I_{SW}$ is compared and reducing the On time of switching device $M_{SW}$.

In response to the current-sense voltage $V_{CS}$ exceeding the threshold voltage $V_{REF\_SS}$, control signal SS_mode transitions from a logic high value to a logic low value, resulting in switch S1 being closed and switch S2 being opened. A voltage of $V_{OCP}$-$V_{GS}$ is applied to the gate of transistor $M_{CLAMP}$ to implement the threshold voltage $V_{OCP}$. As a result of the higher threshold voltage, P-type MOSFET $M_{CLAMP}$ remains Off (i.e., non-conducting) unless the value of voltage $V_{COMP}$ rises above threshold voltage $V_{OCP}$.

Figure 5:
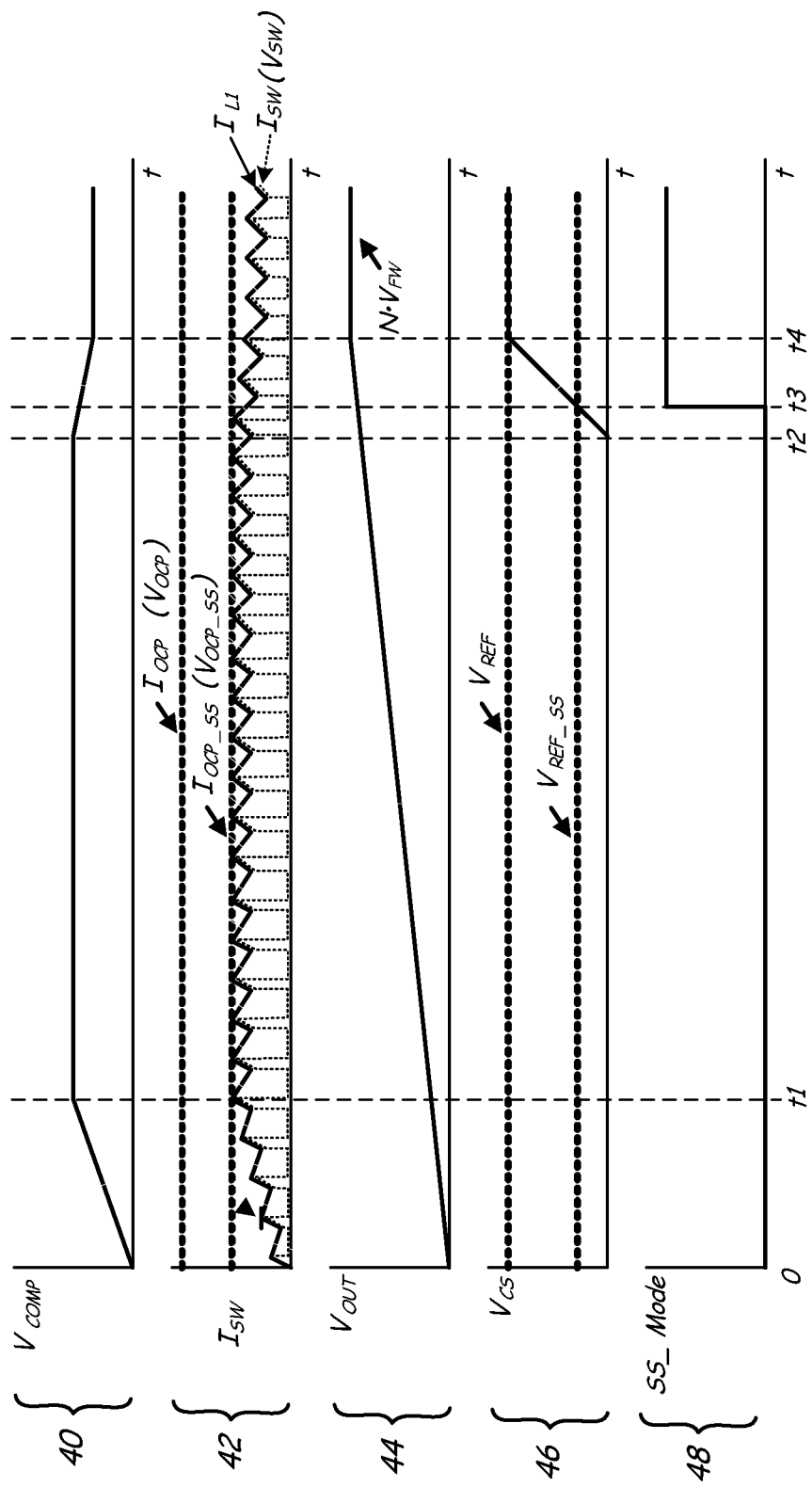
FIG. 5 is a waveform diagram illustrating the operation of the controller in providing soft start protection according to the embodiment of the present invention shown in FIG. 4B.

FIG. 5 is a waveform diagram illustrating the operation of controller 12 in providing soft start protection according to the embodiment of the present invention. In particular, the waveforms were generated with respect to the embodiment described with respect to FIG. 4B.

Waveforms illustrated in FIG. 5 are each represented along time t, provided on the x-axis. Waveform 40 represents the magnitude of the voltage $V_{COMP}$. Waveform 42 illustrates the magnitude of the inductor current $I_{L1}$ through inductor L1 (shown in FIG. 1) as well as the magnitude of the monitored switch current $I_{SW}$. Both are represented as voltage values $V_{L1}$ and $V_{SW}$ for comparison with threshold values $V_{OCP}$ and $V_{OCP\_SS}$ employed over-current protection module 30. The voltage representative of the inductor current $L_{L1}$ is illustrated by the solid line, while the voltage representative of the monitored switch current $I_{SW}$ is monitored by the dashed line. Waveform 44 represents the magnitude of voltage $V_{OUT}$ as measured across capacitor $C_{OUT}$ (as shown in FIG. 1). Waveform 46 represents the magnitude of current-sense voltage $V_{CS}$ as measured across current-sense resistor $R_{CS}$ (shown in FIG. 1), which is a representation of the load current $I_{LOAD}$ through load 14 (also shown in FIG. 1). Waveform 48 represents the control signal SS_mode generated by mode-selection module 18 in response to the monitored current-sense voltage $V_{CS}$.

At time zero, start-up of current-regulated power supply 10 is initiated. At this time, the voltage $V_{COMP}$ is zero, the switching device current $I_{SW}$ (as represented by voltage $V_{SW}$) is zero, and the voltage $V_{OUT}$ across capacitor $C_{OUT}$ is zero. At time zero, the voltage across load 14 is insufficient to forward bias the LEDs making up load 14, such that no current flows through load 14 (as represented by the current-sense voltage $V_{CS}$ being zero). Because the current-sense voltage $V_{CS}$ is zero, the voltage $V_{COMP}$ rises due to the difference between the current-sense voltage $V_{CS}$ (zero) and the reference voltage $V_{REF}$. The rising $V_{COMP}$ voltage results in longer duration On times of switching device drive signal SWG. The longer duration On times results in the saw-tooth increase in the inductor current $I_{L1}$ as illustrated by voltage $V_{L1}$ in waveform 42.

In addition, at time zero the control signal SS_mode provided by mode-selection module 18 (shown in FIG. 3) is initially set to a logic high value because the current-sense voltage is less than the soft-start reference voltage $V_{REF\_SS}$ (e.g., as measured by hysteretic comparator 32 shown in FIG. 4B). The logic high value of the control signal SS_mode results in over-current protection module 30 employing the lower threshold voltage $V_{OCP\_SS}$ as the reference voltage. In the embodiment shown in FIG. 4B, the logic high value of control signal SS_mode results in switch S2 being closed, such that the threshold voltage $V_{OCP\_SS}$ is selected.

At time t1, the rising edge of the monitored switch current $I_{SW}$ increases to a value equal to or slightly greater than the threshold value defined by reference voltage $V_{OCP\_SS}$. In response, over-current protection module 30 clamps the $V_{COMP}$ voltage with $M_{CLAMP}$, and thus reduces the On time of switching device $M_{SW}$. In the time period between times t1 and t2, over-current protection module 30 acts to maintain the switch current $I_{SW}$ (represented by voltage $V_{SW}$) below the threshold value defined by reference voltage $V_{OCP\_SS}$. In this way, the current through inductor L1 (represented by voltage $V_{L1}$) is maintained below the threshold value, thereby minimizing in-rush currents despite the lack of load current feedback due to the diode-like characteristics of load 14. During this time period, the switch current $I_{SW}$ is limited, the charging of capacitor $C_{OUT}$ continues at a slow rate as illustrated by the ramping of voltage $V_{OUT}$ across the capacitor.

At time t2, the voltage $V_{OUT}$ across capacitor $C_{OUT}$ is large enough to forward bias the series-connected LEDs making up load 14. In response, current begins to flow through load 14 as illustrated by the increase in the current-sense voltage $V_{CS}$.

At time t3, the current-sense voltage $V_{CS}$ increases above the threshold $V_{REF\_SS}$. In response, the control signal SS_mode generated by mode-selection module 18 transitions from a logic high signal to a logic low signal. In the embodiment shown in FIG. 4B, switch S2 is opened and switch S1 is closed, resulting in the voltage reference $V_{OCP}$ being supplied to the inverting terminal of hysteretic comparator 36. In addition, the presence of current through load 14 (as evidenced by the increase in current-sense voltage $V_{CS}$) results in current regulation module 16 being provided with feedback that allows the module to operate in a closed-loop mode.

At time t4, the current-sense voltage $V_{CS}$ increases to a level approximately equal to the reference voltage $V_{REF}$. At this time, current-regulation module 16 operates in a steady-state, closed-loop mode in which the load current (represented by current-sense voltage $V_{CS}$) is regulated to a desired value (represented by reference voltage $V_{REF}$). During this time, if the monitored switch current $I_{SW}$ (represented by voltage $V_{SW}$) did increase above the threshold voltage $V_{OCP}$, then over-current protection module 30 would reduce the On time of switch $M_{SW}$ to limit the current and prevent damage.

Figure 6:
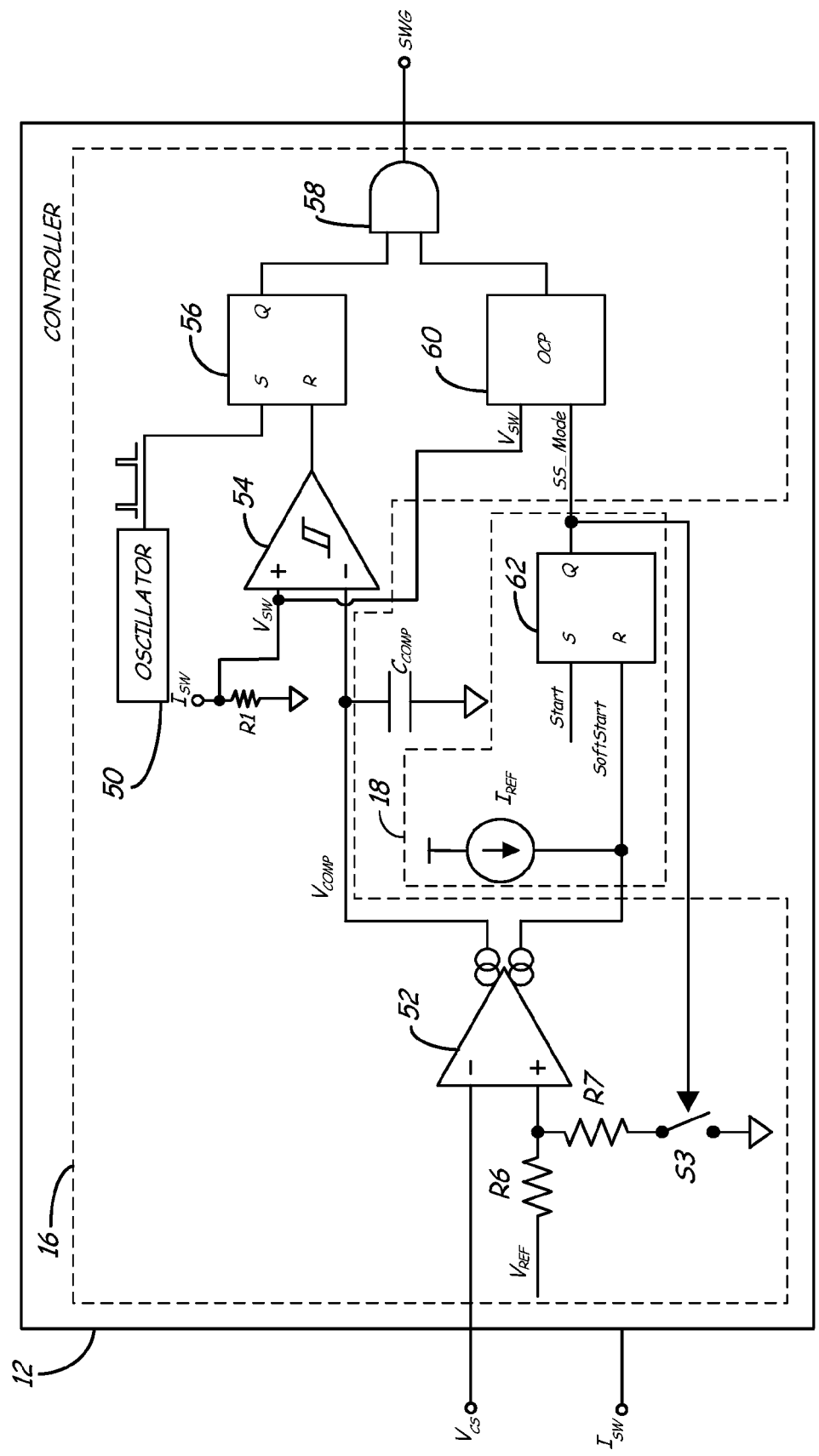
FIG. 6 is a circuit diagram illustrating in additional detail the controller employed by the current-regulated power supply according to an embodiment of the present invention.

FIG. 6 is a circuit diagram illustrating in additional detail controller 12 employed by the current-regulated power supply according to another embodiment of the present invention. Controller 12 once again includes current-regulation module 16 and mode-selection module 18. Current-regulation module 16 includes oscillator 50, error amplifier 52, capacitor $C_{COMP}$, hysteretic comparator 54, and memory module 56, which act to regulate the load current through load 14 based on the current-sense voltage $V_{CS}$. Current-regulation module 16 further includes over-current protection module 60, resistors R1, R6 and R7, and logical AND gate 58. Mode-selection module 18 includes reference current $I_{REF}$ and memory module 62. The output of memory module 62 (i.e., control signal SS_mode) is provided as an input to over-current protection module 60, and determines the operating state of over-current protection module 60. The set terminal of memory module 62 is connected to receive a start signal indicating start-up of the power supply. The start signal may be derived from other portions of power supply circuit 10, such as an under-voltage lockout (UVLO) circuit or power on reset (POR) signal. The start signal indicates the start-up of power supply circuit 10, and in particular that soft-start operation is desired due to a high likelihood of capacitor $C_{OUT}$ being fully depleted. As a result, memory module 62 is set at start-up, and in response provides a logic high signal to current regulation module 16 (specifically to over-current protection module 60) selecting the soft-start mode of operation.

In the embodiments shown in FIGS. 3, 4A and 4B, current-sense voltage $V_{CS}$ is compared to a threshold voltage $V_{REF\_SS}$ to determine the selected mode of operation. In the embodiment shown in FIG. 6, mode selection module 18 selects the mode of operation based on the comparison of current-sense voltage $V_{CS}$ to a reference voltage that varies depending on the selected mode of operation, made possible by the addition of memory module 62. During the soft-start mode of operation, in which control signal SS_mode is a logic high value, switch S3 is closed such that voltage divider network R6 and R7 reduces the reference voltage $V_{REF}$ provided to the non-inverting input of error amplifier 52, implementing the threshold voltage $V_{REF\_SS}$. By lowering the non-inverting input, error amplifier 52 in conjunction with reference current $I_{REF}$ is re-purposed to realize the same function provided by comparator 32 described with respect to the embodiments provided in FIGS. 4A and 4B. At startup, over-current protection module 60 will operate in a soft-start mode based on the SS_mode control signal provided by mode-selection module 18. Once the current-sense voltage $V_{CS}$ exceeds the threshold voltage set by voltage divider network R6 and R7, current protection module operates in normal mode, and error amplifier 52 is configured to provide the same operation as error amplifier 22 in FIG. 3. As described with respect to FIGS. 3, 4A and 4B, over-current protection module 60 employs different current thresholds based on the selected mode of operation.

In addition to modifying the reference voltage to realize the mode selection module function, during start-up, when the current-sense voltage VCS is zero or nearly zero, the difference between the current-sense voltage $V_{CS}$ and the reference voltage $V_{REF}$ is reduced. Reducing the difference at the input of error amplifier 52 decreases the rate at which $V_{COMP}$ increases and, as a result, limits the magnitude of in-rush currents during startup.

In this embodiment, the output of over-current protection module 60 is not provided through a logical OR gate to the reset terminal of a memory module, but instead is combined with the output of memory module 56 by logical AND gate 58 to generate the gate drive signal SWG. This allows over-current protection module 60 to both control the On time and the initial turn-on of drive signal SWG, allowing over-current protection module 60 to protect against short circuit conditions. Both embodiments operate in the same fashion, although depending on the application it may be preferable to employ one over the other.

In response to the output voltage $V_{OUT}$ charging to a voltage sufficiently high to forward bias the diodes D1-DN making up load 14, current-sense voltage $V_{CS}$ increases above the voltage divided reference $V_{REF}$. In response, the output provided by error amplifier 52 decreases, resulting in a reset pulse being delivered to the reset terminal of memory module 62. In response to the reset pulse, control signal SS_mode transitions to a logic low signal that causes switch S3 to open. With switch S3 open, the reference voltage $V_{REF}$ provided to the non-inverting input of error amplifier 52 is increased to the level employed during the normal mode of operation. Likewise, over-current protection circuit 60 transitions from the soft-start mode of operation to the normal mode of operation, if it is being employed in a mode selection role.

The present invention provides a current-regulated power supply with soft start protection to loads exhibiting diode-like turn-on characteristics through various modes of operation. In particular, the present invention selects the desired mode of operation based on the current-sense voltage $V_{CS}$ normally employed to regulate the current provided to a load. The current-sense voltage $V_{CS}$ remains zero until sufficient voltage has been accumulated across the load to forward bias the load (due to the diode-like characteristics of the load). When the current-sense voltage $V_{CS}$ begins to increase beyond a determined threshold value, indicating soft-start of the power supply is complete, the mode of operation is changed from the soft-start mode of operation to a normal mode of operation. As discussed with respect to the various embodiments described with respect to FIGS. 1-6, the soft-start mode of operation and normal mode of operation may be implemented in various ways, including through the use of varying thresholds employed by over-current protection circuits, and changes to the reference voltage to which current-sense voltage VCS is compared.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A controller for regulating a supply of power provided from a current-regulated power supply to a load, the controller comprising:
a current-regulation module connectable to monitor and regulate load current provided by the current-regulated power supply to the load, the current-regulation module having a normal mode of operation and a soft-start mode of operation; and
a mode-selection module connectable to monitor the load current, wherein the mode-selection module causes the current-regulation module to operate in the soft-start mode while the monitored load current is less than a threshold value, and causes the current-regulation module to operate in the normal mode of operation while the monitored load current is greater than a threshold value, wherein the mode-selection module includes a mode-selection comparator connectable to compare the monitored load current to a mode-selection threshold, wherein the mode-selection comparator generates a mode-selection signal selecting the soft-start mode of operation when the load current is less than the mode-selection threshold and normal mode of operation when the load current is greater than the mode-selection threshold.

2. The controller of claim 1, wherein the current-regulation module includes:
an over-current protection module connectable to monitor switch current through a first switching device having an On state and Off state selectively controlled by the current-regulation module, wherein during the normal mode of operation the over-current protection module turns the first switching device Off in response to the monitored switch current exceeding a normal threshold value, wherein during the soft-start mode of operation the over-current protection module turns the first switching device Off in response to the monitored switch current exceeding a soft-start threshold value having a magnitude less than the normal threshold value.

3. The controller of claim 2, wherein the over-current protection module includes:
a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and an over-current comparator connected to compare the selected threshold value provided by the threshold selection circuit to the monitored switch current, wherein the over-current comparator turns the first switching device Off in response to the monitored switch current exceeding the selected threshold value.

4. The controller of claim 2, wherein the current-regulation module includes:

an error amplifier circuit connectable to generate an amplified error signal corresponding to an amplified difference between the monitored load current and a reference signal representing a desired load current; and a comparator connectable to monitor the switch current through the first switching device and to compare the monitored switch current to the amplified error signal, wherein the comparator turns the first switching device Off in response to the monitored switch current exceeding the amplified error signal.

5. The controller of claim 4, wherein the over-current protection module includes:

a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and a voltage clamping circuit connectable to prevent the amplified error signal from exceeding the selected threshold value provided by the threshold selection circuit.

6. The controller of claim 4, wherein the error amplifier circuit generates a mode-selection signal selecting the normal mode of operation when the monitored load current exceeds the reference signal, wherein the reference signal is maintained at a first threshold value during the soft-start mode of operation and a second threshold value, greater than the first threshold value, during the normal mode of operation.

7. The controller of claim 1, wherein the mode-selection module includes:

a memory module connectable to the output of the mode-selection module, wherein the memory module maintains operation in the soft-start mode of operation until a reset signal is received from the mode-selection module causing the current-regulation module to operate in the normal mode of operation.

8. A current-regulated power supply comprising:

an output circuit including a load having diode-like turn-on characteristics, a current-sense device connectable to monitor a load current, and a capacitor connected in parallel with a series combination of the load and the current-sense device;

a controller connected to regulate current to the output circuit, the controller comprising:

a current-regulation module connected to the current-sense device to regulate the load current, the current regulation module having a normal mode of operation and a soft-start mode of operation; and a mode-selection module connected to the current-sense device, wherein the mode-selection module causes the current-regulation module to operate in the soft-start mode of operation when the load is not conducting forward current and in the normal mode of operation when the load is conducting forward current, wherein the mode selection module includes a mode-selection comparator connectable to compare the monitored load current to a mode-selection threshold, wherein the mode-selection comparator generates a mode-selection signal selecting the soft-start mode of operation when the load current is less than the mode-selection threshold and normal mode of operation when the load current is greater than the mode-selection threshold.

9. The current-regulated power supply of claim 8, wherein the load includes one or more light emitting diodes connected in series with one another.

10. The current-regulated power supply of claim 9, wherein the mode-selection module causes the current-regulation module to operate in the soft-start mode while the one or more light emitting diodes are not conducting forward current, and causes the current-regulation module to operate in the normal mode of operation while the one or more light emitting diodes are conducting forward current.

11. The current-regulated power supply of claim 8, wherein the current-regulation module includes:

an over-current protection module connected to monitor an output current being delivered to the output circuit, wherein during the normal mode of operation the over-current protection module limits the output current to a normal value, wherein during the soft-start mode of operation the over-current protection module limits the output current to a soft-start value having a magnitude less than the normal value.

12. The current-regulated power supply of claim 11, wherein the over-current protection module includes:

a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and an over-current comparator connected to compare the selected threshold value provided by the threshold selection circuit to the monitored output current, wherein the over-current comparator turns Off power to the output circuit in response to the monitored output current exceeding the selected threshold value.

13. The current-regulated power supply of claim 11, wherein the current-regulation module includes:

an error amplifier circuit connectable to generate an amplified error signal corresponding to the amplified difference between the monitored load current and a reference signal representing a desired load current; and a comparator connectable to monitor the output current and to compare the monitored output current to the amplified error signal, wherein the comparator is connectable to regulate the output current.

14. The current-regulated power supply of claim 13, wherein the over-current protection module includes:

a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and a voltage clamping circuit connectable to prevent the amplified error signal from exceeding the selected threshold value provided by the threshold selection circuit.

15. The current-regulated power supply of claim 13, wherein the error amplifier circuit generates a mode-selection signal selecting the normal mode of operation when the monitored load current exceeds the reference signal, wherein the reference signal is maintained at a first threshold value during the soft-start mode of operation and a second threshold value, greater than the first threshold value, during the normal mode of operation.

16. The current-regulated power supply of claim 8, wherein the mode-selection module includes:
 a memory module connectable to the output of the mode-selection module, wherein the memory module maintains operation in the soft-start mode of operation until a reset signal is received from the mode-selection module causing the current-regulation module to operate in the normal mode of operation.

17. A method of providing soft-start protection for a current-regulated power supply connected to supply power to a load, the method comprising:
 monitoring a load current provided by the current-regulated power supply to the load;
 operating a current-regulation module in a soft-start mode of operation until the monitored load current exceeds a mode-selection threshold value, wherein operating in the soft-start mode includes:
  generating an amplified error signal corresponding to the amplified difference between the monitored load current and a threshold reference signal representing a desired load current;
  clamping the amplified error signal to prevent it from exceeding a soft-start threshold value; and
  comparing a monitored output current to the amplified error signal, wherein an output of the comparison is connectable to regulate the output current; and
 operating the current-regulation module in a normal mode of operation in response to the monitored load current exceeding the mode-selection threshold value.

18. The method of claim 17, wherein operating the current-regulation module in the soft-start mode of operation includes:
 monitoring output current delivered by the current-regulated power supply to an output circuit that includes the load connected in parallel with a capacitor; and
 limiting the monitored output current from exceeding a soft-start value.

19. The method of claim 17, wherein operating the current-regulation module in the normal mode of operation includes:
 monitoring output current delivered by the current-regulated power supply to an output circuit that includes the load connected in parallel with a capacitor; and
 limiting the monitored output current from exceeding a normal value.

20. A controller for regulating a supply of power provided from a current-regulated power supply to a load, the controller comprising:
 a current-regulation module connectable to monitor and regulate load current provided by the current-regulated power supply to the load, the current-regulation module having a normal mode of operation and a soft-start mode of operation, wherein the current-regulation module further includes:
  an over-current protection module connectable to monitor switch current through a first switching device having an On state and Off state selectively controlled by the current-regulation module, wherein during the normal mode of operation the over-current protection module turns the first switching device Off in response to the monitored switch current exceeding a normal threshold value, wherein during the soft-start mode of operation the over-current protection module turns the first switching device Off in response to the monitored switch current exceeding a soft-start threshold value having a magnitude less than the normal threshold value;
  a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and
  an over-current comparator connected to compare the selected threshold value provided by the threshold selection circuit to the monitored switch current, wherein the over-current comparator turns the first switching device Off in response to the monitored switch current exceeding the selected threshold value; and
 a mode-selection module connectable to monitor the load current, wherein the mode-selection module causes the current-regulation module to operate in the soft-start mode while the monitored load current is less than a threshold value, and causes the current-regulation module to operate in the normal mode of operation while the monitored load current is greater than a threshold value.

21. The controller of claim 20, wherein the current-regulation module includes:
 an error amplifier circuit connectable to generate an amplified error signal corresponding to an amplified difference between the monitored load current and a reference signal representing a desired load current; and
 a comparator connectable to monitor the switch current through the first switching device and to compare the monitored switch current to the amplified error signal, wherein the comparator turns the first switching device Off in response to the monitored switch current exceeding the amplified error signal.

22. The controller of claim 21, wherein the over-current protection module includes:
 a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and
 a voltage clamping circuit connectable to prevent the amplified error signal from exceeding the selected threshold value provided by the threshold selection circuit.

23. The controller of claim 21, wherein the error amplifier circuit generates a mode-selection signal selecting the normal mode of operation when the monitored load current exceeds the reference signal, wherein the reference signal is maintained at a first threshold value during the soft-start mode of operation and a second threshold value, greater than the first threshold value, during the normal mode of operation.

24. A controller for regulating a supply of power provided from a current-regulated power supply to a load, the controller comprising:
 a current-regulation module connectable to monitor and regulate load current provided by the current-regulated power supply to the load, the current-regulation module having a normal mode of operation and a soft-start mode of operation; and a mode-selection module connectable to monitor the load current, wherein the mode-selection module causes the current-regulation module to operate in the soft-start mode while the monitored load current is less than a threshold value, and causes the current-regulation module to operate in the normal mode of operation while the monitored load current is greater than a threshold value, wherein the mode-selection module includes a memory module connectable to the output of the mode-selection module, wherein the memory module maintains operation in the soft-start mode of operation until a reset signal is received from the mode-selection module causing the current-regulation module to operate in the normal mode of operation.

25. A current-regulated power supply comprising:

an output circuit including a load having diode-like turn-on characteristics, a current-sense device connectable to monitor a load current, and a capacitor connected in parallel with a series combination of the load and the current-sense device;

a controller connected to regulate current to the output circuit, the controller comprising:
  a current-regulation module connected to the current-sense device to regulate the load current, the current regulation module having a normal mode of operation and a soft-start mode of operation, wherein the current-regulation module includes an over-current protection module connected to monitor an output current being delivered to the output circuit, wherein during the normal mode of operation the over-current protection module limits the output current to a normal value, wherein during the soft-start mode of operation the over-current protection module limits the output current to a soft-start value having a magnitude less than the normal value; and
  a mode-selection module connected to the current-sense device, wherein the mode-selection module causes the current-regulation module to operate in the soft-start mode of operation when the load is not conducting forward current and in the normal mode of operation when the load is conducting forward current.

26. The current-regulated power supply of claim 25, wherein the over-current protection module includes:
  a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and
  an over-current comparator connected to compare the selected threshold value provided by the threshold selection circuit to the monitored output current, wherein the over-current comparator turns Off power to the output circuit in response to the monitored output current exceeding the selected threshold value.

27. The current-regulated power supply of claim 25, wherein the current-regulation module includes:
  an error amplifier circuit connectable to generate an amplified error signal corresponding to the amplified difference between the monitored load current and a reference signal representing a desired load current; and
  a comparator connectable to monitor the output current and to compare the monitored output current to the amplified error signal, wherein the comparator is connectable to regulate the output current.

28. The current-regulated power supply of claim 27, wherein the over-current protection module includes:
  a threshold selection circuit connected to provide a selected threshold value in response to the selected mode of operation, wherein the threshold selection circuit provides the normal threshold value in response to operation in the normal mode of operation and provides the soft-start threshold value in response to operation in the soft-start mode of operation; and
  a voltage clamping circuit connectable to prevent the amplified error signal from exceeding the selected threshold value provided by the threshold selection circuit.

29. The current-regulated power supply of claim 27, wherein the error amplifier circuit generates a mode-selection signal selecting the normal mode of operation when the monitored load current exceeds the reference signal, wherein the reference signal is maintained at a first threshold value during the soft-start mode of operation and a second threshold value, greater than the first threshold value, during the normal mode of operation.

30. A current-regulated power supply comprising:

an output circuit including a load having diode-like turn-on characteristics, a current-sense device connectable to monitor a load current, and a capacitor connected in parallel with a series combination of the load and the current-sense device;

a controller connected to regulate current to the output circuit, the controller comprising:
  a current-regulation module connected to the current-sense device to regulate the load current, the current regulation module having a normal mode of operation and a soft-start mode of operation; and
  a mode-selection module connected to the current-sense device, wherein the mode-selection module causes the current-regulation module to operate in the soft-start mode of operation when the load is not conducting forward current and in the normal mode of operation when the load is conducting forward current, wherein the mode-selection module includes a memory module connectable to the output of the mode-selection module, wherein the memory module maintains operation in the soft-start mode of operation until a reset signal is received from the mode-selection module causing the current-regulation module to operate in the normal mode of operation.

* * * * *